US007443314B2

(12) United States Patent
Konishi et al.

(10) Patent No.: US 7,443,314 B2
(45) Date of Patent: Oct. 28, 2008

(54) COMMUNICATION DEVICE FOR A MOVABLE BODY

(75) Inventors: Yoshichika Konishi, Obu (JP); Yasumasa Yamamoto, Kariya (JP); Eiji Niwa, Nagoya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 122 days.

(21) Appl. No.: 11/348,479

(22) Filed: Feb. 7, 2006

(65) Prior Publication Data

US 2006/0181431 A1 Aug. 17, 2006

(30) Foreign Application Priority Data

Feb. 16, 2005 (JP) ............................... 2005-038692

(51) Int. Cl.
*G08G 1/16* (2006.01)
*G08G 1/00* (2006.01)

(52) U.S. Cl. ........................ 340/903; 340/435; 340/902; 701/300

(58) Field of Classification Search ............... 340/539.1, 340/426.16, 435, 903, 902, 439; 701/300, 701/301

See application file for complete search history.

(56) References Cited

U.S. PATENT DOCUMENTS

| 5,847,661 | A * | 12/1998 | Ricci ........................... 340/902 |
| 5,969,969 | A * | 10/1999 | Ejiri et al. ...................... 701/41 |
| 6,265,968 | B1 * | 7/2001 | Betzitza et al. ............. 340/436 |
| 6,411,898 | B2 * | 6/2002 | Ishida et al. ................. 701/211 |
| 6,429,812 | B1 * | 8/2002 | Hoffberg ................. 342/357.1 |
| 6,675,081 | B2 * | 1/2004 | Shuman et al. ................ 701/48 |
| 6,765,495 | B1 * | 7/2004 | Dunning et al. ............. 340/903 |
| 6,813,561 | B2 * | 11/2004 | MacNeille et al. .......... 701/213 |
| 7,010,583 | B1 * | 3/2006 | Aizono et al. ............... 340/989 |
| 7,046,168 | B2 * | 5/2006 | Tsuboi ....................... 340/903 |
| 7,085,633 | B2 * | 8/2006 | Nishira et al. .................. 701/36 |
| 2006/0192687 | A1 | 8/2006 | Konishi et al. |
| 2006/0194543 | A1 * | 8/2006 | Konishi et al. ................ 455/64 |
| 2007/0030212 | A1 | 2/2007 | Shibata |

FOREIGN PATENT DOCUMENTS

| EP | 1 111 339 A1 | 6/2001 |
| EP | 1 772 839 A1 | 4/2007 |
| JP | 2001-283381 | 10/2001 |
| JP | 2003-6797 A | 1/2003 |
| WO | WO 01/43104 A1 | 6/2001 |
| WO | WO 2006/011235 A1 | 2/2006 |

OTHER PUBLICATIONS

European Search Report dated Aug. 3, 2007.

* cited by examiner

*Primary Examiner*—George A Bugg
*Assistant Examiner*—Eric M Blount
(74) *Attorney, Agent, or Firm*—Buchanan Ingersoll & Rooney PC

(57) ABSTRACT

A communication device for a movable body mounted to each of movable bodies for exchanging information among the movable bodies includes a surrounding detecting device for detecting a surrounding of the movable body, an appropriateness of relay determining device for determining an appropriateness of relay, a first transmitting process device for transmitting a first signal, a first receiving process device for receiving the first signal sent by the first transmitting process device, a second transmitting process device for determining whether or not the relay is required, and a second receiving process device for receiving the second signal sent by the second transmitting process device.

11 Claims, 7 Drawing Sheets

COMMUNICATION DEVICE FOR A MOVABLE BODY

CROSS REFERENCE TO RELATED APPLICATIONS

This application is based on and claims priority under 35 U.S.C. § 119 to Japanese Patent Application 2005-038692, filed on Feb. 16, 2005, the entire content of which is incorporated herein by reference.

FIELD OF THE INVENTION

The present invention generally relates to a communication device, which is mounted to each of the movable bodies, in order to exchange information among the movable bodies.

BACKGROUND

Various types of communicating device for transmitting and receiving signals among plural vehicles in order to exchange information have been known so far, and, for example, an inter-vehicle communication system disclosed in JP2001-283381A is capable of communicating information among plural vehicles traveling on a road. The inter-vehicle communication system includes a drive aiding camera mounted on the user's vehicle itself in order to support driving and captures images around the user's vehicle. On the basis of the captured images, traveling related information including a traffic condition around the user's vehicle is detected, and the information is transmitted to the other vehicles by means of a wireless transmitter.

Further, as a technology for general mobile communications, a Multi-hop Wireless Network has been known so far. For example, by means of the Multi-hop Wireless Network, signals can be relayed among movable bodies so that the movable bodies, which cannot directly communicate each other, can indirectly communicate each other. Further, a routing protocol used for building routes of various kinds of Multi-hop Wireless Networks has been developed.

According to the device disclosed in JP2001-283381A, when the user's vehicle detects a traffic condition or abnormal occurrences, it sends the information to all vehicles, which exist within a range where a wireless communication is available. However, because the wireless communication generally uses signals of a high frequency wave, when obstacles such as a building exist between the vehicles, it becomes difficult to communicate between vehicles behind the obstacles.

Further, even when the signals are blocked by a building or the like and cannot be sent and received between two vehicles, using the routing protocol used for building routes of various kinds of Multi-hop Wireless Networks, the signals are relayed by another movable body and appropriately sent and received between the two movable bodies. However, within the Multi-hop Wireless Network between movable bodies such as vehicles, because the signals are randomly hopped, it takes some time to converge the route and communication efficiency is decreased A need thus exists to provide a communication device for a movable body mounted to each of movable bodies for exchanging information among the movable bodies that can, even when an obstacle exists between movable bodies, a signal is relayed by a movable body, which is positioned at appropriate area (e.g. obstacle-free area) and selected to relay the signal, in order to sent and receive the signal appropriately between movable bodies.

SUMMARY OF THE INVENTION

According to an aspect of the present invention, a communication device for a movable body mounted to each of movable bodies for exchanging information among the movable bodies includes a surrounding detecting means for detecting a surrounding of the movable body, an appropriateness of relay determining means for determining an appropriateness of relay on the basis of the result detected by the surrounding detecting means, a first transmitting process means for transmitting a first signal including information indicating a condition of the movable body and the result determined by the appropriateness of relay determining means, a first receiving process means for receiving the first signal sent by the first transmitting process means and memorizing the first signal in a memorizing means, a second transmitting process means for determining whether or not the relay is required on the basis of the first signal memorized in the memorizing means, and transmitting a second signal including information of a movable body assigned to be requested to relay the signal, and a second receiving process means for receiving the second signal sent by the second transmitting process means in order to determine whether or not the relay request exists, and relaying the signal to the movable body assigned to be requested to relay the signal.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
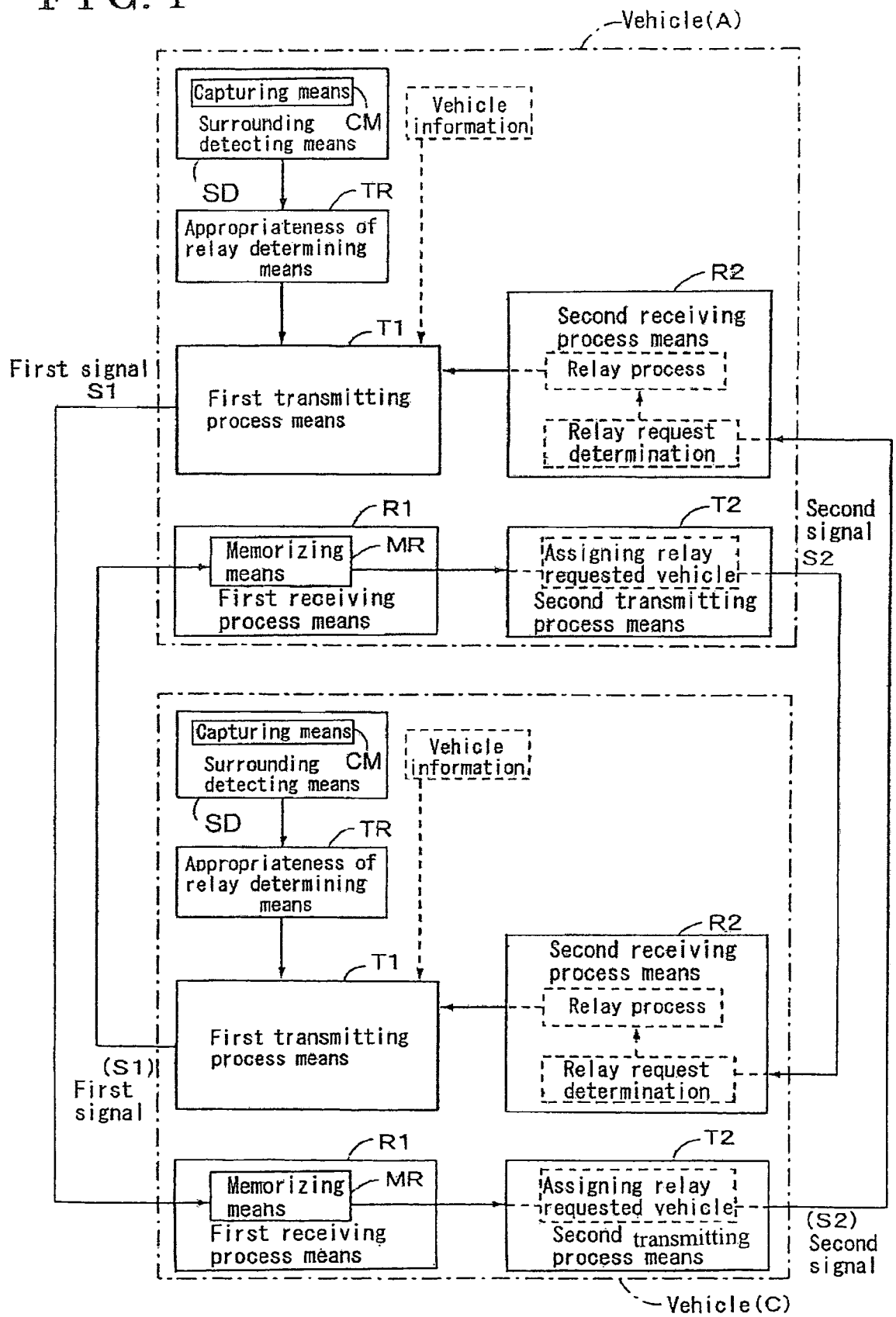
FIG. 1 illustrates a block diagram indicating a configuration of an embodiment of a communication device for a movable body according to the present invention.

An embodiment of the communication device for a movable body according to the present invention will be explained in accordance with the attached drawings. As shown in FIG. 1, the communication device for a movable body is mounted to each of the vehicles, for example to a vehicle A and a vehicle C illustrated with a chain line, and they communicate each other as described later. Specifically, each of the vehicles A and C includes a surrounding detecting means SD, an appropriateness of relay determining means TR, a first transmitting process means T1, a first receiving process means R1, a second transmitting process means T2 and a second receiving process means R2. More specifically, the surrounding detecting means SD detects a surrounding of the vehicle, and the appropriateness of relay determining means TR determines whether or not the relay is appropriate on the basis of the detected result by the surrounding detecting means SD. Further, according to the vehicle A, the first transmitting process means T1 sends a first signal (S1), which includes information indicating a condition of the vehicle A and information indicating the result determined by the appropriateness of relay determining means TR. The first receiving process means R1 receives the first signal (S1) sent from the first transmitting process means T1 and sequentially memorizes the first signal (S1) in the memorizing means MR. The second transmitting process means T2 determines the propriety of relaying on the basis of the information memorized in the memorizing means MR and sends a second signal (S2) including information, in which a vehicle such as the vehicle C is assigned to be requested for relaying the signal. The second receiving process means R2 receives the second signal (S2) sent by the second transmitting process means T2 and determines whether or not the signal includes information related to the relay request. Further, when the second receiving process means R2 determines that the signal includes the relay request, the signal is relayed to another vehicle (except the user's own vehicle) such as the vehicle C, to which the relay request sent by the first transmitting process means T1. Thus, as shown in FIG. 1, the signal is sent and received between the vehicle A and the vehicle C, which has a same configuration as the vehicle A. The first signal (S1) and the second signal (S2) may not be set individually. Their functions are included in a transmitting and receiving signal, which is sent and received at a predetermined cycle as described later.

The surrounding detecting means SD includes a capturing means CM, which is provided, for example, at the front portion of the vehicle so as to be able to capture a front image of the vehicle and right and left images of a predetermined angle of the vehicle. Further, each of the first transmitting process means T1, the second transmitting process means T2, the first receiving process means R1 and the second receiving process means R2 may be comprised of a wireless transceiver as mentioned below, and a configuration of each means is illustrated in FIG. 2.

Figure 2:
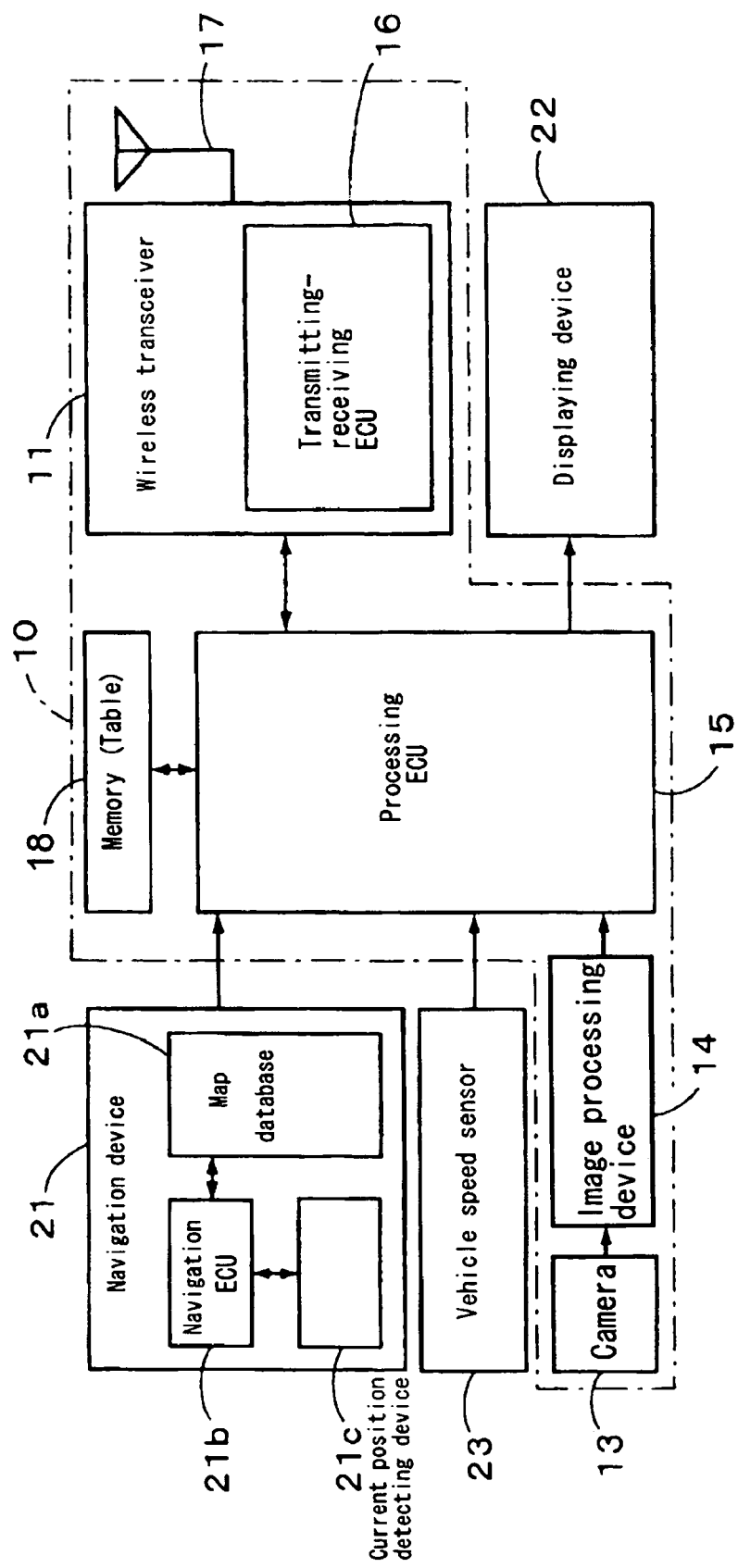
FIG. 2 illustrates a block diagram indicating an example of the configuration including the vehicle communication device according to the embodiment of the present invention.

FIG. 2 illustrates an example of the configuration of the communication device for a movable body including the above means. Specifically, a communication device for a movable body 10 of this embodiment includes a wireless transceiver 11, a transmitting and receiving device (transmitting-receiving ECU) 16 (e.g., serving as the transmitting process means and the receiving process means), a image processing device 14 (e.g., serving as the surrounding detecting means), a processing device (processing ECU) 15 (e.g., serving as the transmitting process means and the receiving process means) and a memory 18 (e.g., serving as the memorizing means). Further, a navigation device 21 and a displaying device 22 are connected to the processing ECU 15 of the communication device for a movable body 10.

The wireless transceiver 11 is used for exchanging information by means of a wireless communication (transmitting and receiving) through an antenna 17 within a range in which the signal reaches at a predetermined output value of wireless communications. The information received by the wireless transceiver 11 is processed by the transmitting-receiving ECU 16 and outputted to the processing ECU 15 as necessary. Further, various kinds of information is directly sent to each of the vehicles, which exists within the range in which the signal can reach by the wireless means.

The information, which is sent by the wireless transceiver 11, includes information indicating the vehicle condition, for example the position of the user's vehicle, and indicating the traveling state. More specifically, the information indicating the position of the user's vehicle includes a current location of the user's vehicle detected by the navigation device 21. The information is represented by using latitude and longitude (hereinbelow referred to as a user's vehicle location). Further, the information indicating the traveling state includes a vehicle speed detected by the vehicle speed sensor 23, and an image captured by the camera 13 is included in the vehicle information. The information of the user's vehicle location, the traveling direction and the vehicle speed are provided to the transmitting-receiving ECU 16 by means of the processing ECU 15, and they are organized as vehicle information, to which a vehicle ID and a data serial number are assigned. The vehicle information is sent at every predetermined time period. Further, a data forwarding number is automatically assigned. For example, "n" such as an integral number is assigned to the data, which is initially sent as the user's vehicle information, and "n−1" is assigned to the data forwarding from the vehicle, which receives the user's vehicle information. Specifically, every time the data is forwarded, the data forwarding number, in which one is subtracted from "n", is sequentially assigned. Further, in the transmitting-receiving ECU 16, when the data forwarding number of the received information is larger than zero, the information is relayed and forwarded (hopping).

The camera 13 is mounted to, for example, the front portion of the vehicle, so as to be able to capture a front image of the vehicle and right and left images of a predetermined angle of the vehicle. An image signal of the image, which is captured by the camera 13, is outputted to the image processing device 14. On the basis of the image signal, the image processing device 14 determines whether or not an obstacle such as a building or a wall, which interrupts the wireless communication, exists especially on the left and the right of the user's vehicle. Specifically, the image processing device 14 determines complexity of the surrounding on the basis of the distribution of differentials of luminance in the image signal. More specifically, the complexity of the surrounding is calculated as follows. First, the captured image is divided into blocks, and in each block, it is examined whether or not luminance of the pixels are even. When it is determined that the luminance of the pixels in each block are not even, the captured image is further divided into smaller blocks. This process is repeated until it is determined that the luminance of the pixels in each block becomes even. When the luminance becomes even, the number of the blocks are counted, and the counted number is compared to the predetermined value. When the number of the blocks is larger than the predetermined value, it is determined that an obstacle exists around the user's own vehicle. This result is outputted to the process ECU 15. Because this calculation is described in detail in JP2003-67727, explanation of further details will be skipped.

As mentioned above, in this embodiment, the surrounding detecting means is comprised of the camera 13 and the image processing device 14, and with such as simple configuration, the existence of an obstacle can be determined. The complexity of the surroundings may not be calculated on the basis of the luminance, and it may be calculated on the basis of brightness, hue, chroma or density. In order to determines whether or not the obstacle exists, laser, infrared light or sonar can be used alternatively.

The processing ECU 15 includes a digital computer, which is comprised of a RAM (random access memory), a ROM (read only memory), a CPU (central processing unit) or the like. On the basis of the output (an existence of an obstacle around the user's own vehicle) from the image processing device 14, it is determined whether or not a relay (hopping) is appropriate as mentioned later. Further, the processing ECU 15 displays an image captured by the camera 13 on the displaying device 22 on the basis of the vehicle information of another vehicle inputted from the transmitting-receiving ECU 16 and includes various kinds of processes functions. Thus, these processes are shared by the image processing device 14, the processing ECU 15 and the transmitting-receiving ECU 16, however, they can be set flexible depending on the designing advantage.

The navigation device 21 includes a map database 21*a*, a navigation ECU 21*b*, and a current position detecting device 21*c*. The current position detecting device 21*c* detects a current location of the user's vehicle on the basis of the electric waves from plural GPS satellites. Then, the navigation ECU 21*b* obtains the information of the current position calculated by the current position detecting device 21*c*. On the basis of the information of the current position, a traveling direction of the user's vehicle is detected. Further, the vehicle speed sensor 23, for example, detects a pulse of the transmission and provides the processing ECU 15 as a vehicle speed signal.

The displaying device 22 is provided near the installment panel of the vehicle, and generally displays the information from the navigation device 21. The processing ECU 15 switches the displaying device 22 to display the image from the navigation device 21 or to display another image, for example an image of the surrounding in the traveling direction of the user's vehicle on the basis of the vehicle information sent from another vehicle.

Figure 3:
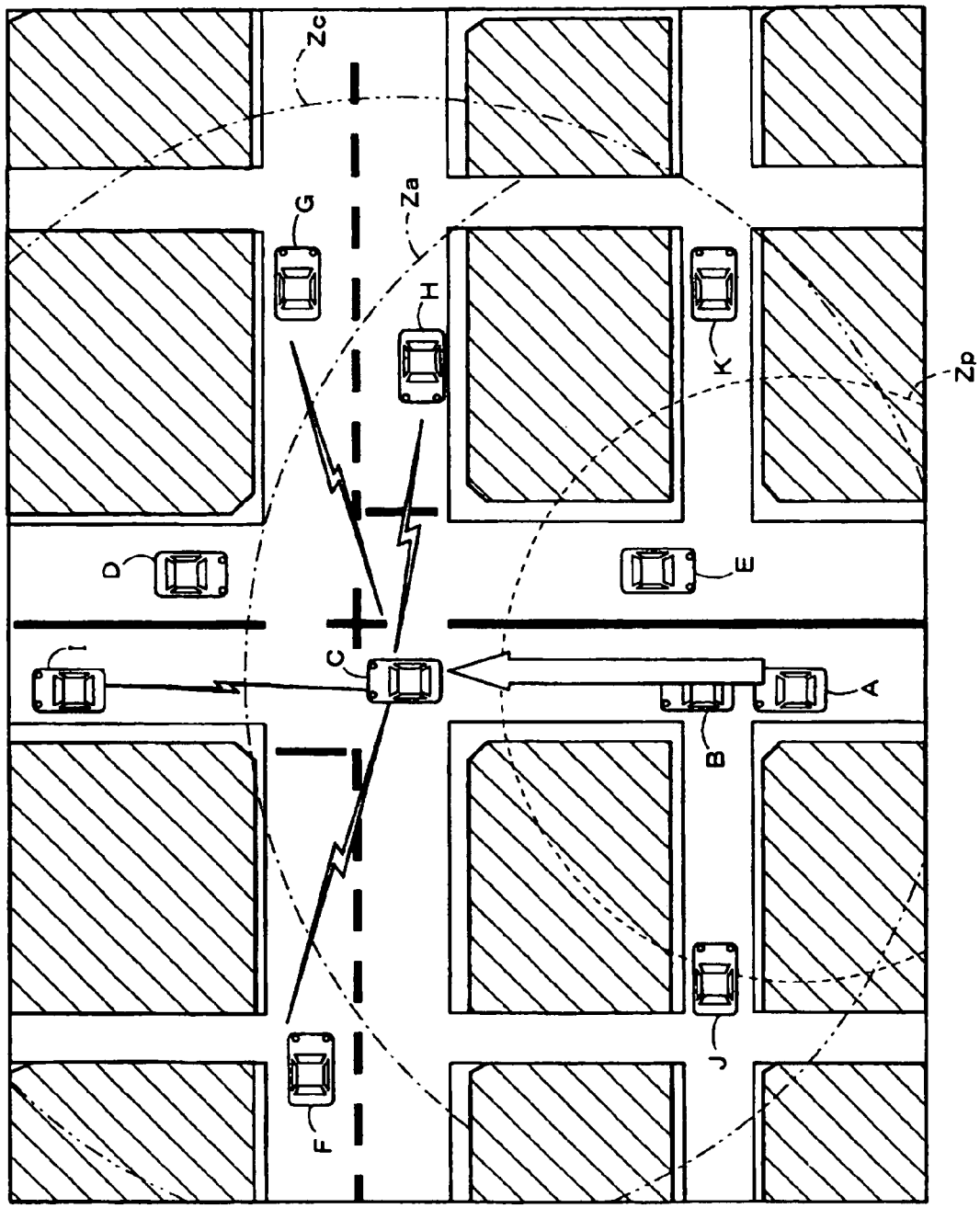
FIG. 3 illustrates a flat diagram indicating an example of a communication of the embodiment of the communication device for a movable body (e.g. vehicle) according to the present invention.
Figure 4:
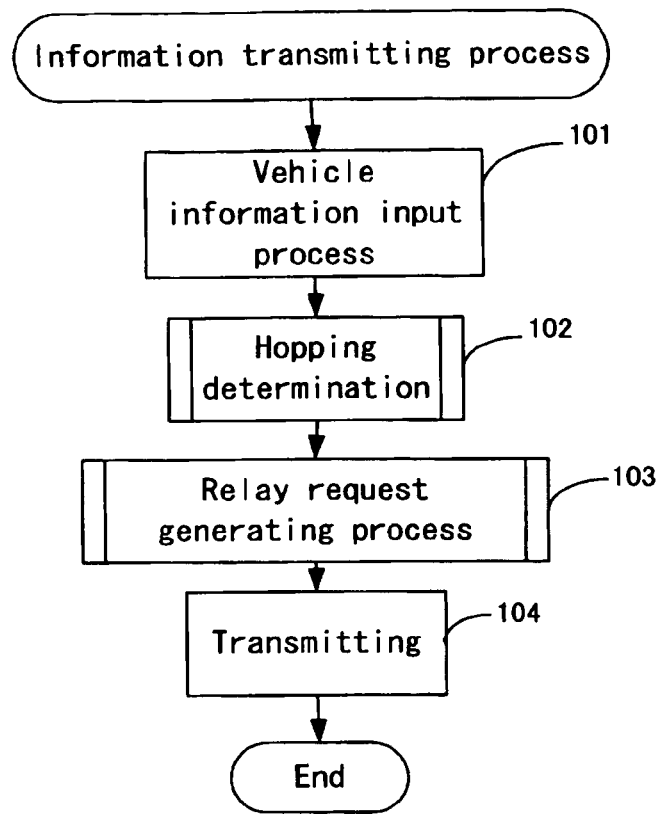
FIG. 4 illustrates a flowchart indicating a routine of an information transmitting process according to the embodiment of the present invention.
Figure 5:
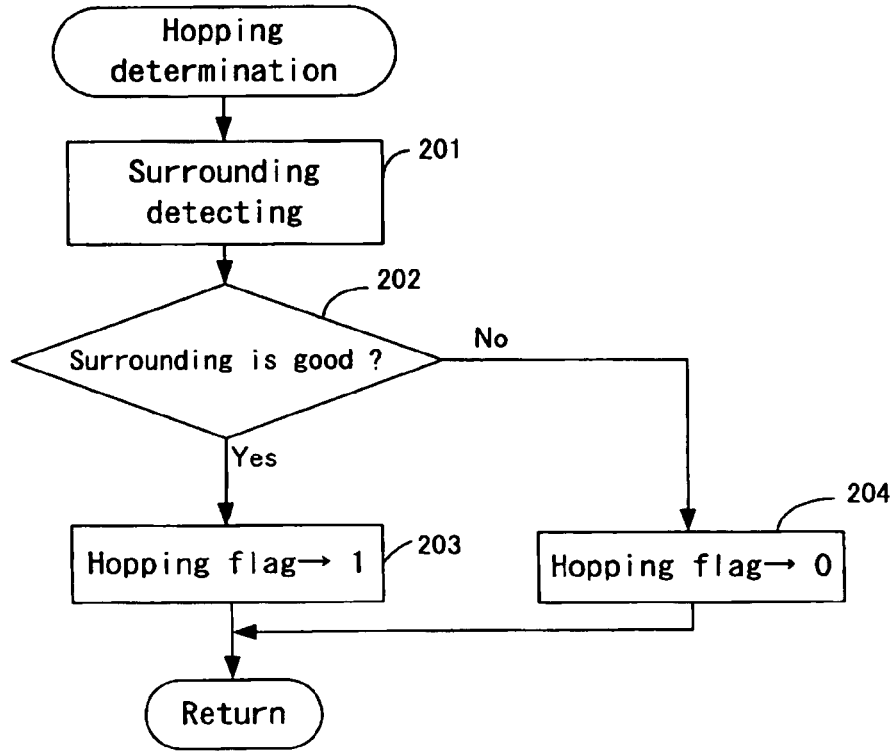
FIG. 5 illustrates a flowchart indicating a hopping determining process shown in FIG. 4.
Figure 6:
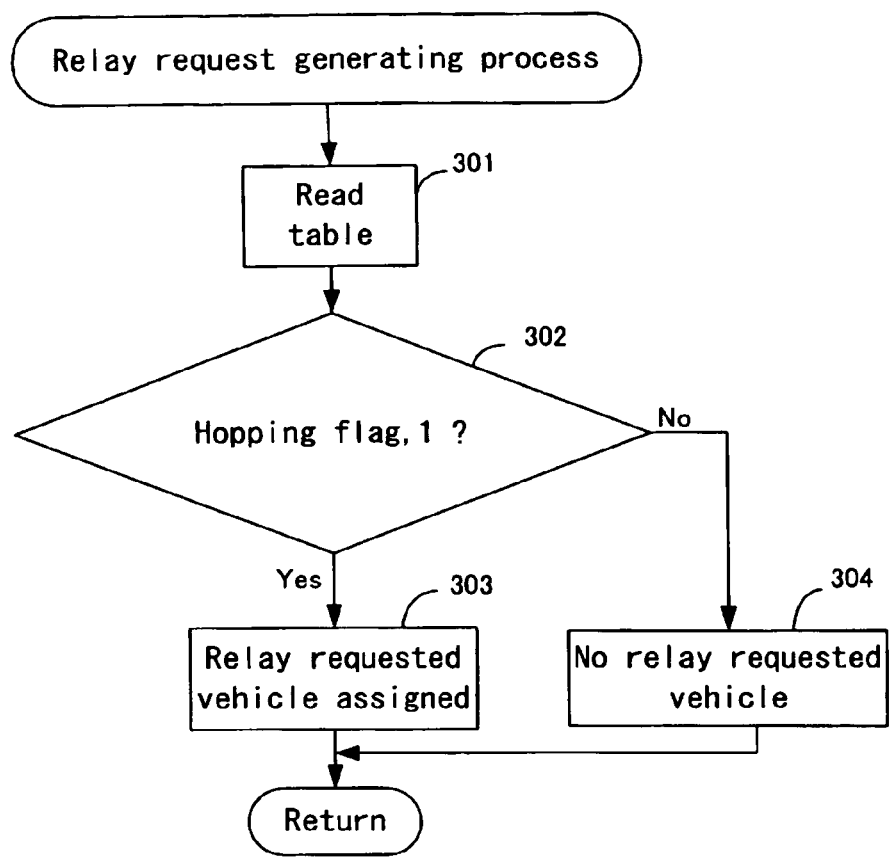
FIG. 6 illustrates a flowchart indicating a relay request generating process shown in FIG. 5.
Figure 7:
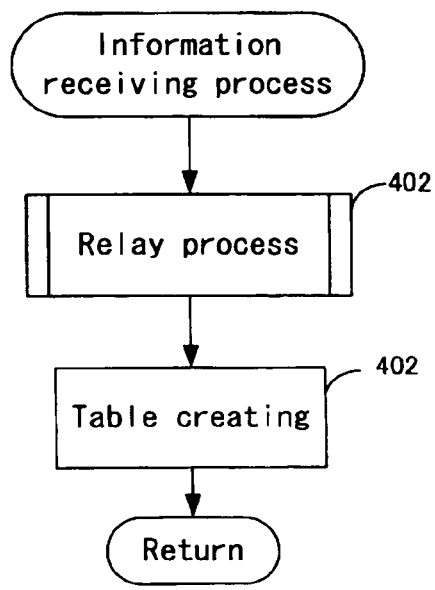
FIG. 7 illustrates a routine of an information receiving process according to the embodiment of the present invention.
Figure 8:
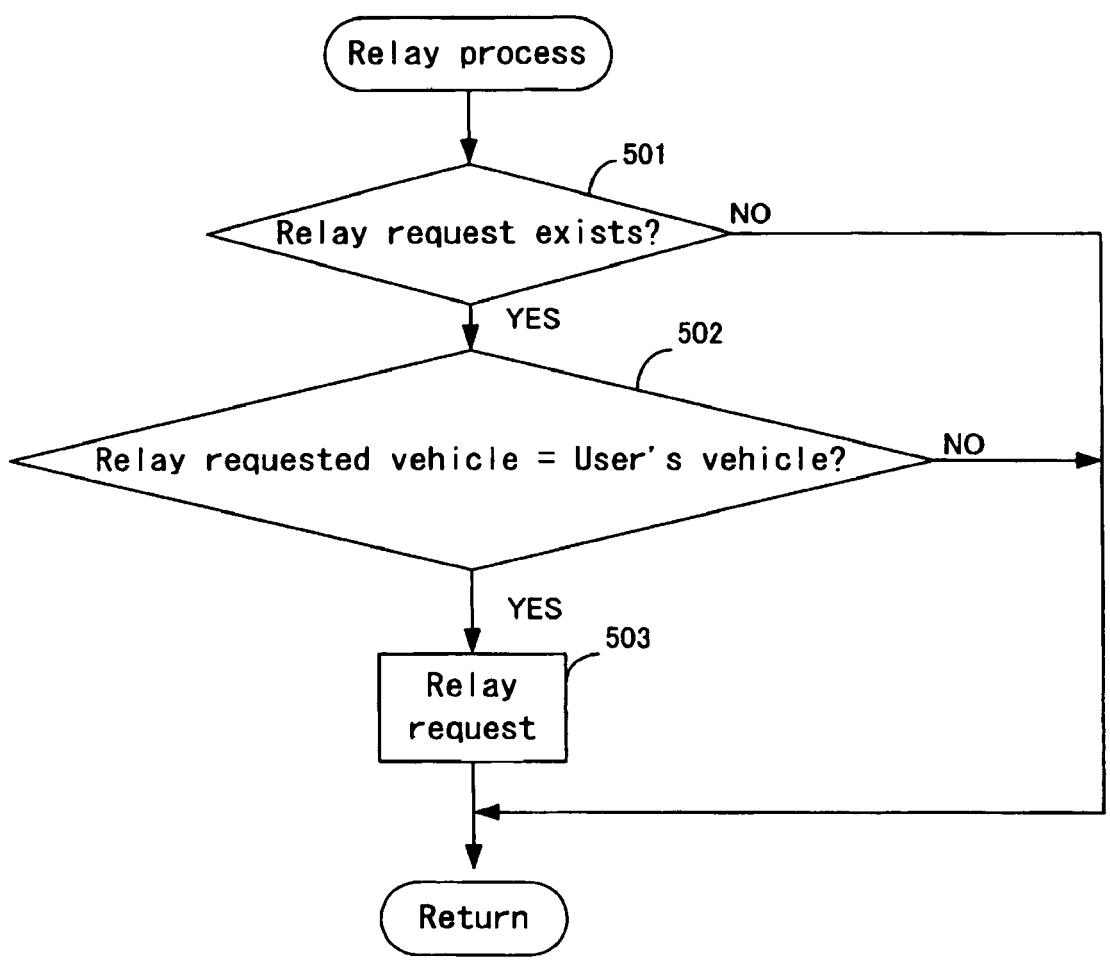
FIG. 8 illustrates a flowchart indicating a relay process shown in FIG. 7.

The communication device for a movable body 10 is mounted to each of the vehicles, and in each of the image processing device 14, the processing ECU 15 and the transmitting-receiving ECU 16 of each of the communication device for a movable body 10, transmitting and receiving processes of the information are repeated in predetermined cycles as shown in FIG. 4 through FIG. 8. FIG. 4 illustrates a main routine of the information transmitting process, and FIG. 5 and FIG. 6 is sub routines of the information transmitting process. The first transmitting process means T1 and the second transmitting process means T2 illustrated in FIG. 1 executes these routines. FIG. 7 illustrates a main routine of the information receiving process, and FIG. 8 illustrates the sub routine of the information receiving process. The first receiving process means R1 and the second receiving process means R2 illustrates in FIG. 1 executes these routines. In the transmitting and receiving processes illustrated in FIG. 4 through FIG. 8, processes of the first transmitting process means T1, the second transmitting process means T2, the first receiving process means R1 and the second receiving process means R2 of each vehicle are described together. To avoid confusion, the process executed in the vehicle A in FIG. 3 is explained as the process in the use's vehicle, and the process executed in the vehicle C in FIG. 3 is explained as the process in the another vehicle.

First, as shown in FIG. 4, information such as the user's vehicle location, the traveling direction and the vehicle speed is inputted in Step 101, and the process goes to Step 102. In Step 102, it is determined whether or not the hopping (relaying, transferring) is appropriate, and then the process goes to Step 103. In Step 103, a relay request generating process is executed and in Step 104, the result in Step 103 is sent. The hopping determination in Step 102 is executed in the first transmitting process means T1 and the process of the hopping determination is executed as a flow chart illustrated in FIG. 5. Specifically, in Step 201 of FIG. 5, the surrounding (front, side, rear or entire circumference) of the user's vehicle is detected as an image captured by the camera 13, and on the basis of the image signal, in Step 202, it is determined whether or not the surrounding is opened. For example, as the vehicle C illustrated in FIG. 3, when it is determined that there is no obstacle around the vehicle, the process goes to Step 203 and the hopping flag is set such as "1". On the other hand, as vehicle A illustrated in FIG. 3, when it is determined that there is an obstacle around the vehicle, the process goes to Step 204 and the hopping flag is cleared (the hopping flag is set such as "0"). The hopping flag that is set through the process corresponds to the relay request result and sent in Step 104 to the surrounding vehicles as vehicle information together with the vehicle ID and a data serial number.

Then, the relay request generating process in Step 103 is executed by the second transmitting process means T2 as shown in FIG. 4. Specifically, in Step 301, the result of the hopping flag corresponding to the relay request result is read in a table for each vehicle provided at a memory 15 (memorizing means). For example, according to the vehicle A illustrated in FIG. 3, the hopping flag is memorized such as "0" in the table, and according to the vehicle C, the hopping flag is memorized such as "1" in the table.

Then, the process goes to Step 302. In Step 302, related to another vehicles positioned within a predetermined range (e.g., in a range Za, serving as a first range, in FIG. 3 within which the signal reaches from the vehicle A at a predetermined output value of wireless communications and also out of a range Zp, serving as a second range, in FIG. 3), it is determined whether or not the hopping flag is "1". For example, within the range Za in FIG. 3, vehicles B, C and E exist, however, because the vehicles B and E exist in the range Zp, only the vehicle C is considered as a vehicle having a hopping flag "1". Thus, the vehicle C is assigned as a relay requested vehicle, which is requested to relay the signal, and the process goes to the main routine illustrates in FIG. 4. This information related to the relay requested vehicle, is included in the vehicle information, which is sent in Step 104 in FIG. 4.

On the other hand, when it is determined that there is no vehicle which fulfills the above conditions in Step 302, the process goes to Step 304. In Step 304, no vehicle is assigned as a vehicle, which is required to relay the signal, and the process goes back to the main routine. The range Zp that is used as a condition in Step 302 may be set on the basis of a predetermined distance from the user's vehicle, however, when plural vehicles exist within the range Zp, the vehicle existing farthest apart from the user's vehicle within the range Za may be assigned as the vehicle required to relay the signal. The condition may vary.

FIG. 7 illustrates a main routine of an information receiving process. Specifically, in Step 401, the second receiving process means R2 executes a relay process following a flow chart illustrated in FIG. 8. First, in Step 501, it is determined whether or not the relay request exists. Specifically, it is determined whether or not the relay request exists on the basis of the vehicle information. In Step 501, if it is determined that the relay is requested, the process goes to Step 502. In Step 502, on the basis of the vehicle information, which is sent from another vehicle, it is determined whether or not the relay requested vehicle is identical to the user's vehicle. If it is determined that the relay requested vehicle is identical to the user's vehicle, the process goes to Step 503 and the signal is relayed by the user's vehicle. If it is determined that the relay requested vehicle is not identical to the user's vehicle, the information is not relayed.

For example, as shown in FIG. 3, when the vehicle A requests the vehicle C, which exists in a clear circumstance, to relay the signal, the vehicle information includes information about the vehicle C, which is requested to relay the signal. The vehicle C, which receives the information sent from the vehicle A, is considered as another vehicle relative to the vehicle A in FIG. 3, however, when the information is relayed by the vehicle C, the vehicle C is considered as a user's own vehicle and executes the relay process. Specifically, in Step 503 illustrated in FIG. 8, the relay is requested by the second receiving process means R2 of the vehicle C relative to the first transmitting process means T1. For example, even when the vehicle H which surrounding is not clearer than the vehicle C such as the vehicle transmitting the information from the vehicle A is exists, the information from the vehicle A is not relay by the vehicle H because the vehicle H does not include the information (relay request) being requested to relay the signal. Then, in the Step 503, depending on the above relay request, as the detected result by the surrounding detecting means SD, the captured image captured at the vehicle C is sent from the first transmitting process means T1 and received, for example, by the second receiving process means R1 of the vehicle A.

Figure 9:
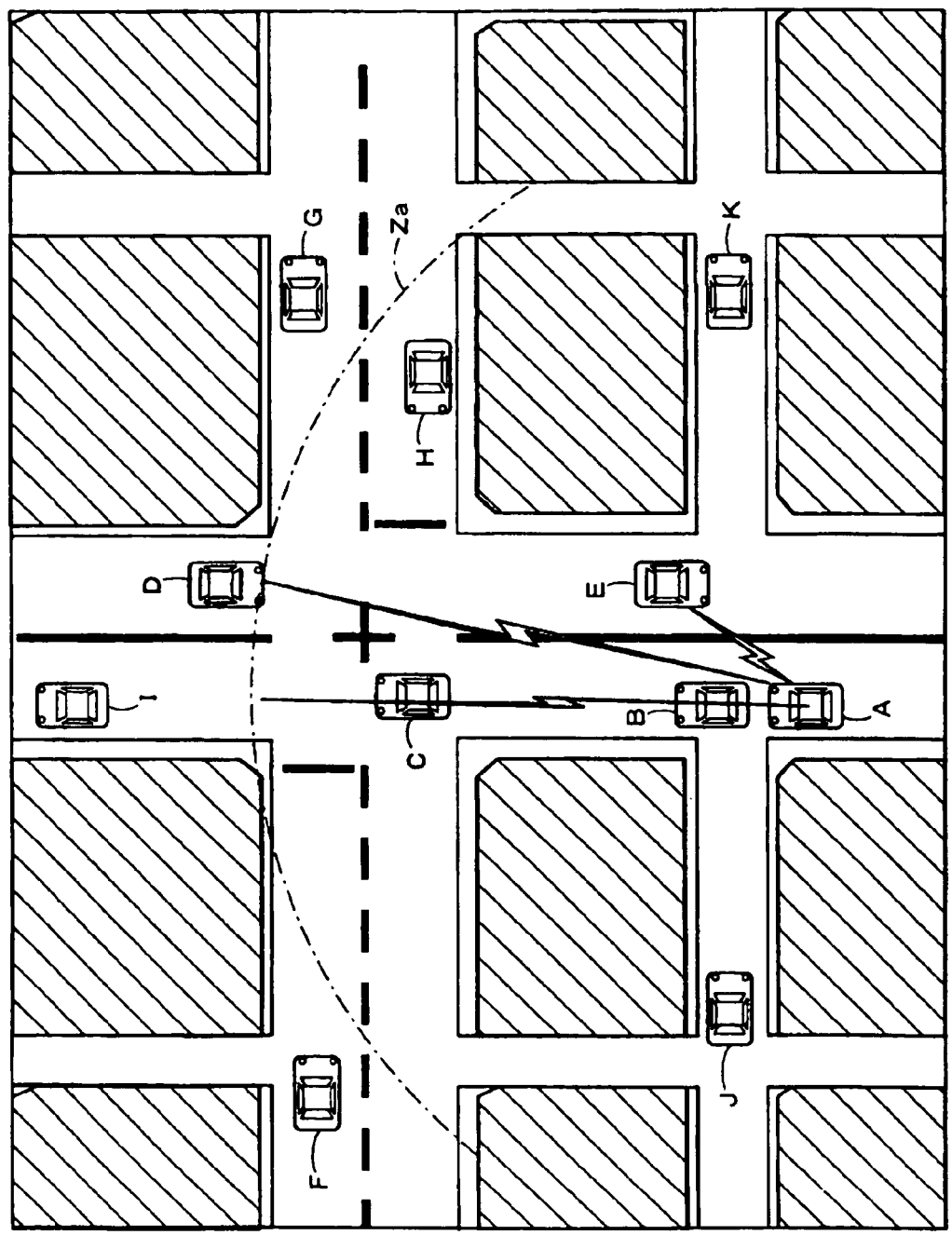
FIG. 9 illustrates an explanation view indicating an example of a communication state of a known communication device for a movable body.

As shown with a white arrow in FIG. 3, because the vehicle A can displays on the displaying means 22 illustrated in FIG. 2 the image that is captured by the vehicle C located in front of the vehicle B, which is located right front of the vehicle A, the vehicle A can confirm in advance the opened surrounding within the range Zc in FIG. 3, which covers far larger area comparing to the vehicle B. FIG. 9 illustrates a communication state of a vehicle A including a known communication device. The vehicle A can communicate with the vehicles B, C, D and E, however, the vehicle A cannot communicate with other vehicles. Thus, comparing FIG. 3 to FIG. 9, it is apparent that the known communicating device has enough advantage in terms of the relaying process. The communicating device of a movable body according to this embodiment can execute the relaying process by means of a communication device that is mounted to an appropriate vehicle even when there is an obstacle such as a building among the vehicle A through the vehicle K, as a result, appropriate information can be sent and received among them.

According to the present invention, the communication device for a movable body selects a communication device, which is mounted to a movable body being located where no obstacles exists around it, as a movable body to be requested to relay a signal. Thus, appropriate information can be sent and received effectively. Specifically, even when there is an obstacle that interrupts the communication between specific movable bodies, the signal can be sent and received more effectively comparing to the case where the signal is relayed randomly among the plural movable bodies.

Further, according to the present invention, a surrounding detecting means is comprised of a camera and an image processing device, and with such as simple configuration, the existence of an obstacle can be determined. Furthermore, the communication device according to the present invention further includes a wireless transceiver, in which a first transmitting process means, a second transmitting process means, a first receiving process means and a second receiving process means are mounted to each of the plural movable bodies. With such a simple configuration, the signal can be sent and received appropriately.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A communication device mountable on one of a plurality of movable bodies for exchanging information with other communication devices mounted on other movable bodies comprising:

a surrounding detecting means for detecting a surrounding of the movable body;

an appropriateness of relay determining means for determining an appropriateness of relay by determining whether or not an obstacle interrupts a wireless communication on the basis of the result detected by the surrounding detecting means;

a first transmitting process means for transmitting a first signal including information indicating a condition of the movable body and the result determined by the appropriateness of relay determining means;

a first receiving process means for receiving the first signal sent by the first transmitting process means and memorizing the first signal in a memorizing means;

a second transmitting process means for determining whether or not the relay is required on the basis of the first signal memorized in the memorizing means, and transmitting a second signal including information of a movable body assigned to be requested to relay the signal; and a second receiving process means for receiving the second signal sent by the second transmitting process means in order to determine whether or not the relay request exists, and relaying the signal to the movable body assigned to be requested to relay the signal, wherein the first transmitting process means of the communication device of one of the movable bodies sends the first signal to each of the other communication devices of the other movable bodies by way of the first transmitting process means, each of the other movable bodies receives the first signal by way of the first receiving process means and memorizes the first signal in the memorizing means, the second transmitting process means of each of the other communication devices of the other movable bodies determines the appropriateness for relaying on the basis of the first signal memorized in the memorizing means, the second transmitting process means of each of the other communication devices of the other movable bodies sends the second signal to the second receiving process means of the communication device of the one of the movable bodies, and the second receiving process means determines whether or not the relay requests exists and relays the signal to the movable body assigned to be requested to relay the signal.

2. The communication device for a movable body according to claim 1, wherein the surrounding detecting means includes a capturing means that is mounted to the movable body.

3. The communication device for a movable body according to claim 2 further includes a wireless transceiver, in which the first transmitting process means, the second transmitting process means, the first receiving process means and the second receiving process means are mounted to each of the plural movable bodies.

4. The communication device for a movable body according to claim 1 wherein the appropriateness of relay determining means determines an appropriateness of relay at the processing device, which is connected to a navigation device and a displaying device.

5. The communication device for a movable body according to claim 1, wherein information indicating the movable body's condition includes a current position, which is detected by the navigation device, a traveling direction and a traveling state of a user's movable body.

6. The communication device for a movable body according to claim 5, wherein an identification number and a data serial number is assigned to information of the current location, the traveling direction and a movable body's speed, and the information is sent as the first signal by the first transmitting process means to movable bodies around the use's movable body at every predetermined time period.

7. The communication device for a movable body according to claim 3, wherein the surrounding detecting means includes a camera, and on the basis of an image signal sent by the camera, it is determined whether or not there is an obstacle, which interrupts the wireless communication, around the user's movable body.

8. The communication device for a movable body according to claim 7, wherein the appropriateness of relay determining means determines that the relay is appropriate when there is no obstacle around the movable body, and determines that the relay is not appropriate when an obstacle exist around the movable body.

9. The communication device for a movable body according to claim 1, wherein the appropriateness of relay determining means examines an appropriateness of relay relative to the movable body, which is located within a first range and also located out of a second range, which is smaller than the first range.

10. The communication device for a movable body according to claim 9, wherein the movable body, which is determined as appropriate for relaying, is assigned as a relay requested movable body.

11. The communication device for a movable body according to claim 1 wherein the appropriateness of the relay determining means determines an appropriateness of relay at a processing device, which is connected to a navigation device.

* * * * *